United States Patent [19]

Fischer et al.

[11] Patent Number: 4,756,591
[45] Date of Patent: Jul. 12, 1988

[54] DEVICE FOR RELEASABLE COUPLING OF AN OPTICAL FIBER TO AN OPTOELECTRONIC COMPONENT

[75] Inventors: Karl Fischer, Munich; Werner Spaeth, Holzkirchen, both of Fed. Rep. of Germany

[73] Assignee: Siemens Aktiengesellschaft, Berlin and Munich, Fed. Rep. of Germany

[21] Appl. No.: 698,712

[22] Filed: Feb. 6, 1985

[30] Foreign Application Priority Data

Feb. 9, 1984 [DE] Fed. Rep. of Germany ....... 3404613

[51] Int. Cl.⁴ .............................................. G02B 6/36
[52] U.S. Cl. ................................ 350/96.20; 350/96.15
[58] Field of Search ............... 350/96.11, 96.15, 96.17, 350/96.18, 96.20, 96.21, 96.22

[56] References Cited

U.S. PATENT DOCUMENTS

| 3,936,631 | 2/1976 | Muska | 250/227 |
| 4,165,914 | 8/1979 | Villarruel et al. | 350/96.2 X |
| 4,181,400 | 1/1980 | Malsot et al. | 350/96.2 X |
| 4,268,756 | 5/1981 | Crouse et al. | 250/551 |
| 4,466,696 | 8/1984 | Carney | 350/96.2 |
| 4,585,303 | 4/1986 | Pinsard et al. | 350/96.2 |

Primary Examiner—Eugene R. Laroche
Assistant Examiner—Steven J. Mottola
Attorney, Agent, or Firm—John Francis Moran

[57] ABSTRACT

A device for releasably coupling an optical fiber to an optoelectronic component comprises a support (3) having a V-shaped groove (2) cut into it for holding an optical fiber. The fiber terminates with its end face opposite an optoelectronic component (1) fixed on the same support (3). The optical fiber is fixed in the groove (2) by means of spring force (5) which acts on holding elements (16,17) as well as plastic layers (15) that press the fiber into the groove (2).

15 Claims, 2 Drawing Sheets

DEVICE FOR RELEASABLE COUPLING OF AN OPTICAL FIBER TO AN OPTOELECTRONIC COMPONENT

BACKGROUND OF THE INVENTION

The invention relates to a device for the releasable coupling of an optical fiber to an optoelectronic component provided with a support.

The coupling of optical fibers to optoelectronic components—as, for example, to transmitting or receiving components such as light-emitting diodes, PIN diodes or phototransistors—should be releasable. The same applies in many cases to the coupling of an optical fiber to another optical fiber. In the following description, therefore, the term "optoelectronic component" is intended to include also another optical fiber.

When coupling optical fibers to optoelectronic components, it is necessary to provide a connection for either a single fiber or group of fibers (light conductors) arranged in a bundle. In the following description, therefore, the term "optical fiber" is intended to include both single fibers (conductors) and multiple (bundled) fibers (conductors).

Heretofore the coupling of optical fibers to optoelectronic components has been effected by means of plug-to-plug connections. Such connections have proven satisfactory in practice especially since, as a rule, only a relatively few connections must be made at any point of an installation.

Plug-to-plug connections are not satisfactory, however, when optical fibers with a very large number of conductors are used as is the case, for example, in the construction of power plant applications and at switching nodes of a telecommunication system. This is attributable to the fact that plug/plug connections require substantial space and the time spent for installation is considerable. The large space requirement is incompatible with the trend toward miniaturization of the respective electronic system, and the time spent increases in proportion to the number of conductors in an optical fiber.

SUMMARY OF THE INVENTION

It is, therefore, the object of the present invention to provide a device with which requires little space and permits even an optical fiber with many conductors to be coupled releasably with an optoelectronic component.

This object, as well as other objects which will become apparent from the discussion that follows, are achieved, according to the invention, by providing a support with a V-shaped groove adapted to receive an optical fiber in such a way that the end face of the optical fiber is aligned with the active surface of the component for optimum transmission of light.

In the device according to the invention, therefore, no plug/plug connections are necessary. Yet an optical fiber can be releasably coupled with an optoelectronic component while ensuring a durable adjustment between the active surface of the optoelectronic component and the end face or end of the optical fiber.

The device according to the invention consists essentially of the support which is provided with the V-shaped groove for precise positioning of the optical fiber and which, moreover, retains the optoelectronic component so that the latter's active surface is oriented toward the end face and/or aligned in the direction of the axis of the optical fiber.

During initial production of the support, it is possible to make all the necessary adjustments so that it is then only necessary to provide the optoelectronic component on the support at well defined locations and to insert the optical fiber in the groove of the support. This means that as the optical fiber is being positioned, only the tolerances of the fiber geometry—that is, the tolerances of the individual conductors—can lead to deviations from the desired position of the fiber axis relative to the active surface of the optoelectronic component.

Additional tolerances, as they exist in plug/plug connections, are entirely eliminated in the device according to the invention since the device does not require different separate parts as in a plug and socket. The deviations a of the fiber axis from the desired normal position relative to the active surface of the optoelectronic component, to be expected in the device according to the invention, essentially obey the equation:

$$a = \frac{\Delta D}{\sin \frac{\gamma}{2} \cdot 2},$$

where $\gamma$ is the base angle of the groove and $\Delta D$ is the deviation of the fiber axis relative to the fiber geometry which results from the tolerances of the individual conductors.

A durable retention of the optical fiber inserted in the V-shaped groove of the support can be ensured and maintained by an elastic pressure area, as can be effected, for example, by two metal parts coated with plastic and supported by springs.

The optical fiber is fixed in the groove preferably by means of two independent holding elements, comprising, for example, a metal part on which a plastic layer is applied. The plastic layer may comprise a suitable elastomer. In fact, with the first holding element in place, the optical fiber can first be inserted in the groove and provisionally adjusted, visual inspection being still possible. Thereafter, the second holding element is put in place, definitively covering and fixing the optical fiber in the groove.

The holding elements can be pressed onto the optical fiber in the groove by means of a spring force, so that temperature changes, etc., are automatically compensated for even during long periods of use.

To connect optical fibers to optoelectronic components, first the optical fibers are stripped of their protective covering at their end regions, and a perfect fracture is produced by means of a fiber cutter. It may, of course, be appropriate also to protect the thus exposed ends of the optical fibers, for example with a very thinly applied protective lacquer, before making the break. In that case, a sufficient reserve of fiber should be provided before the junction between the optical fibers and the optoelectronic components so that mounting is facilitated and the optical fibers can be coupled to the optoelectronic components without stress.

The device according to the invention also permits the end-to-end coupling of two optical fibers. In this case one optical fiber is inserted from each end into a continuous V-groove in the support. It is then preferable to provide at least one holding element for each optical fiber. The junction between the two end faces of the two optical fibers being appropriately covered and fixed by an additional holding element.

The device according to the invention makes it possible to connect optical fibers with optoelectronic components of any kind, as for example hybrid circuits, integrated electronic circuits, transmitter drivers and receiving amplifiers. If desired, these components may be joined on a single support.

The support may comprise, for example, a silicon crystal into which the V-shaped groove is etched. To protect the optical fiber against damage, it is advantageous to metallize the silicon crystal at least in the region of the V-shaped groove.

The depth of the V-shaped groove may preferably be adapted to the diameter of the bare fiber of the optical fiber in the region of the coupling point between the optical fiber and the optoelectronic component (either active device or another optical fiber). Otherwise the depth of the groove is somewhat greater and corresponds to the diameter of the fiber surrounded by its protective covering.

For a full understanding of the present invention, reference should now be made to the following detailed description of the preferred embodiments of the invention and to the accompanying drawings.

BRIEF DESCSRIPTION OF THE DRAWINGS

DESCRIPTION OF THE PREFERRED EMBODIMENTS

Figure 1:
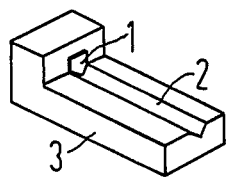
FIG. 1 is a perspective view of a device, according to a first embodiment illustrative of the present invention for releasably coupling an optical fiber to an optoelectronic component.

FIG. 1 shows a support 3 comprising, for example, silicon and having cut therein a V-shaped groove 2. At the end of this groove 2 is an optoelectronic component 1, such as a light-emitting diode. This component 1 is fixed on the support 3 in such a way that its active surface is to face in the direction of groove 2.

An optical fiber (not shown) is placed into groove 2, so that its end face is aligned with the active surface of component 1. In this way the optical fiber will receive the light radiated by component 1 (light-emitting diode) and transmit it to another location.

Figure 2:
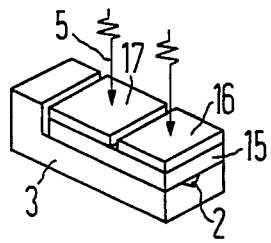
FIG. 2 is a perspective view of the device of FIG. 1, having holding elements placed on it.

As is indicated in FIG. 2, the optical fiber is fixed in groove 2 by a plastic layer 15. This plastic layer is pressed against the optical fiber as well as the surface of support by means of holding elements 16, 17. The plastic layer may be fabricated from an elastomer.

The holding elements 16, 17 are preferably fixed by means of a spring force (indicated by the arrows 5), so that temperature fluctuations and the like are compensated even over extended use.

To install an optical fiber in the groove 2, the optical fiber is first placed in the groove. The first half of the elastomer layer 15 is then positioned in the area below the holding element 17. Thereafter, the element 17 is inserted and subjected to the spring force. After this process it is still possible to adjust the optical fiber in the groove 2 because the optical fiber is fixed in groove 2 by the holding element 17 only at its very end. After final adjustment of the optical fiber in groove 2, the other half of the plastic layer 15 is applied together with the holding element 16.

Figure 3:
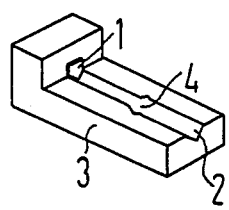
FIG. 3 is a perspective view of a second illustrative embodiment of the present invention having different groove depths.

FIG. 3 illustrates a different embodiment of the invention, wherein the groove 2 has a step 4. This step permits the depth of groove 2 to be adapted to the optical fiber. In the region of groove 2 adjacent to the component 1 the depth is made less so as to accommodate the bare fiber of the optical fiber. In the region farther away from component 1 the depth of groove 2 is greater, so as to accommodate also the protective cover of the optical fiber. In other words, the protective cover of the optical fiber ends at step 4, so that only the bare conductors of the optical fiber are brought up to the optoelectronic component 1.

Figure 4:
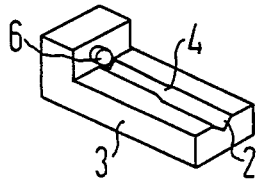
FIG. 4 is a perspective view of a third illustrative embodiment of the present invention in which the optoelectronic component is disposed in a housing.

FIG. 4 depicts a third form of the device according to the invention, where the optoelectronic component 1 is equipped additionally with a housing 6. This housing 6 is transparent in the part adjacent to groove 2, so that light can be transmitted from the optical fiber via the transparent housing 6 to component 1 and vice versa.

Figure 5:
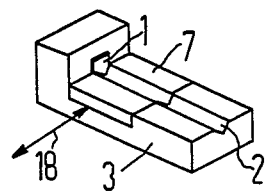
FIG. 5 is a perspective view of a fourth illustrative embodiment of the present invention.

FIG. 5 demonstrates another form of the device according to the invention, wherein an additional part 7 is inserted into support 3 and forms the groove 2. This additional part 7 makes possible an especially precise adjustment of the end of the optical fiber relative to the active surface of component 1 because the part 7 can be shifted in a direction transverse to the longitudinal axis of groove 2 as indicated by the double arrow 18. By appropriate positioning of part 7, therefore, the end of the optical fiber can be precisely aligned with the active surface of the component 1.

Figure 6:
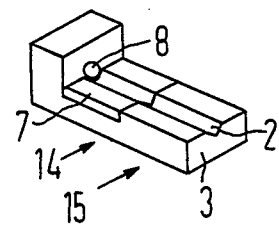
FIG. 6 is a perspective view of a fifth illustrative embodiment of the present invention.

FIG. 6 is a modification of the embodiment of FIG. 5, which includes, in addition, a lens 8 at the end of groove 2 in order to focus the light emitted from component 1 onto the end face of the optical fiber.

In the embodiment of FIG. 6, the groove 2 has a region 19, which is farther away from component 1, of a somewhat lesser depth than in the region 14 near the lens 8, so that the optical fiber placed in groove 2 presses itself down and is therefore not subject to impermissible stress in the region 14.

Figure 7:
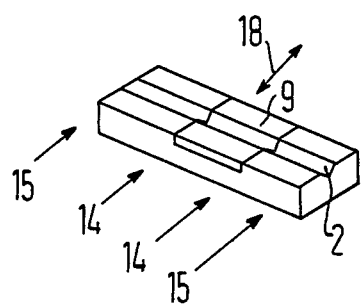
FIG. 7 is a perspective view of a sixth illustrative embodiment of the present invention which is adapted to connect two optical fibers.

FIG. 7 shows an embodiment of the invention for connecting two optical fibers. In this example the part of groove 2 which accommodates the junction of the two optical fibers lies in a part 9 corresponding to part 7 of the embodiment of FIG. 5. This part 9 facilitates the adjustment of the two optical fibers with respect to each other in the direction of the arrow 18.

Figure 8:
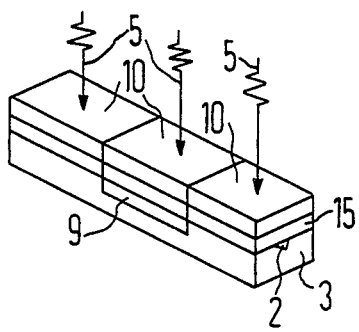
FIG. 8 is a perspective view of the device of FIG. 7 with holding elements placed on it.

FIG. 8 illustrates the manner in which the device of FIG. 7 may be covered by three plastic layers 15 and three corresponding holding elements 10, with a spring force 5 acting on each. The optical fibers are securely coupled together in groove 2 by means of these plastic layers 15 and holding elements 10.

Figure 9:
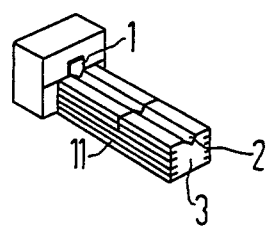
FIG. 9 is a perspective view of a seventh illustrative embodiment of the present invention.
Figure 10:
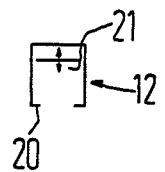
FIG. 10 is a schematic diagram of a holding clamp employed in the device of FIG. 9.

FIG. 9 shows a form of the device according to the invention where the support piece 3 has longitudinal flutes 11 in its lateral faces in the region of the groove 2. These flutes permit engagement by the ends 20 of U-shaped claws 12 (FIG. 10). Inside the claws are retaining springs 21 which press the optical fiber into groove 2.

Figure 11:
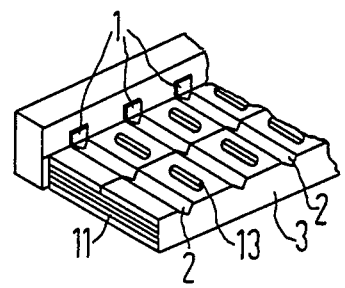
FIG. 11 is a perspective view of an eighth illustrative embodiment of the present invention wherein the device support has several grooves.

Lastly, FIG. 11 illustrates a form of the device according to the invention where such flutes 11 are additionally provided in various slots 13, so that it is possible, by means of the claws 12, to allow several optical fibers to terminate alongside each other on the same support 3 in a combined or multiple arrangement, with each optical fiber end facing a separate optoelectronic component 1.

There has thus been shown and described novel devices for releasably coupling an optical fiber which fulfill all the objects and advantages sought therefor. Many changes, modifications, variations and other uses and applications of the subject invention will, however, become apparent to those skilled in the art after considering this specification and the accompanying drawings which disclose preferred illustrative embodiments thereof. All such changes, modifications, variations and other uses and applications which do not depart from the spirit and scope of the invention are deemed to be covered by the invention which is limited only by the claims which follow.

What is claimed is:

1. A device for the detachable coupling of an optical fiber to an optoelectronic component, the device comprising: an integral support having means for retaining the optoelectronic component and having a V-shaped groove therein for receiving the end of the optical fiber, said retaining means and said groove having a predetermined orientation such that the end face of the optical fiber is aligned with the active surface of the component for optimum transmission of radiation; means for applying a spring force to hold the optical fiber in said groove; said spring force applying means includes two holding elements disposed on the side of said optical fiber opposite to said groove and spring means for applying an independent compressional force to each of said two holding elements; and said two holding elements comprising a metal portion and including a resilient layer disposed between said two holding elements and the optical fiber while engaged and for detaching the optical fiber while disengaged.

2. The device recited in claim 1, wherein said groove is stepped to provide a matched support for a portion of the optical fiber which is bare and a portion which has a protective cover.

3. The device recited in claim 1, wherein said resilient layer is an elastomer.

4. The device recited in claim 1, wherein said holding elements are coated with said resilient layer comprising plastic.

5. The device recited in claim 1, wherein said support is made of a silicon crystal.

6. The device recited in claim 5, wherein said silicon crystal is provided with metallization.

7. The device recited in claim 1, further comprising lens means arranged between said active surface of the optoelectronic component and said end face of the optical fiber.

8. The device recited in claim 1, wherein the optoelectronic component is a second optical fiber and said active surface of the component is the end face of the second optical fiber.

9. The device recited in claim 1, wherein said support is provided with flutes, said device further comprising at least one holding element having claws which engage said flutes, said holding element being adapted to fix the optical fiber in said groove.

10. The device recited in claim 9, wherein said flutes are cut into the sides of openings provided in said support.

11. The device recited in claim 10, wherein said openings are slot-shaped recesses.

12. The device recited in claim 9, wherein said flutes are cut into the lateral faces of said support and extend parallel to said groove.

13. The device recited in claim 1, wherein said groove has a slanting depth.

14. A device for the detachable coupling of an optical fiber to an optoelectronic component, the device comprising: an integral support body having means for retaining the optoelectronic component and having a V-shaped groove therein for receiving the end of the optical fiber, said retaining means and said groove having a predetermined orientation such that the end face of the optical fiber is aligned with the active surface of the component for optimum transmission of radiation; said groove being stepped to provide two different axially aligned V-grooves serving as a matched support adapted dimensionally for a portion of the optical fiber which is bare and adapted dimensionally for a portion which has a protective cover; and means for applying a spring force to hold and in alignment the optical fiber in said groove while engaged and for detaching the optical fiber while disengaged.

15. Apparatus for detachably coupling an optical fiber to an optoelectronic component, the apparatus comprising: an integral support member having means for retaining the optoelectronic component and having a V-shaped groove therein adapted to receive a portion of the optical fiber, the integral support member further having a rectangular recess in the region immediately adjacent to the means for retaining the optoelectronic component, a rectangular member having a V-shaped groove on its exterior substantially aligned with the V-shaped groove of the integral support member adapted for insertion into the rectangular recess and capable of lateral movement within said rectangular recess for precise alignment of the end of the optical fiber with the optoelectronic component, and clamping means extending over the fiber and both of the v-grooves for maintaining the precise alignment between the end of the optical fiber and the optoelectronic component while engaged and for detaching the optical fiber while disengaged.

* * * * *